May 12, 1931.  J. H. THIBEAULT  1,804,960
OIL VALVE DRAIN
Filed March 29, 1928
Fig. 1.
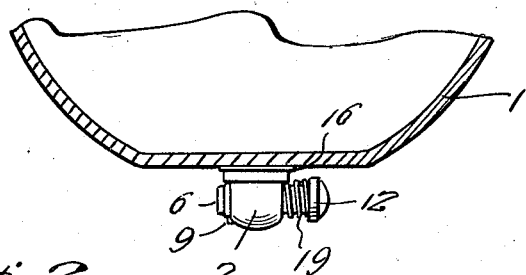
Fig. 2.  Fig. 3.
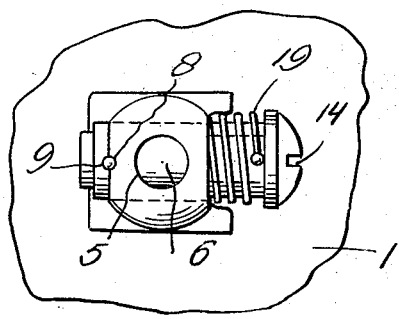 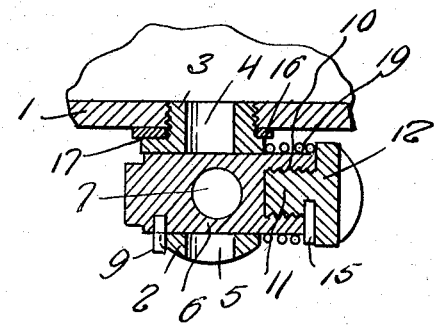
Fig. 4.
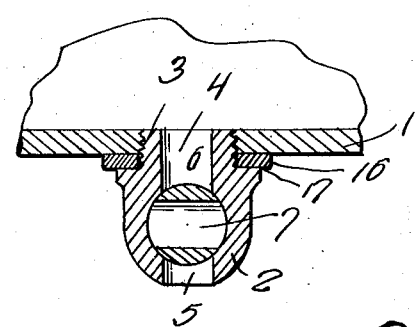
Inventor
J. H. Thibeault,
By Clarence A O'Brien
Attorney Patented May 12, 1931

1,804,960

UNITED STATES PATENT OFFICE

JOSEPH H. THIBEAULT, OF WARE, MASSACHUSETTS

OIL VALVE DRAIN

Application filed March 29, 1928. Serial No. 265,740.

The present invention relates to an oil valve drain for automobile crank cases. In accordance with the present practice, when the crank case of an internal combustion engine on an automobile is to be drained of oil, it is necessary to screw a plug out of the crank case. This operation renders it necessary for the operator to crawl under the vehicle, the plug frequently drops into the oil bucket therebelow and generally, the process of draining a crank case on an automobile is inconvenient.

The prime object of the invention is to provide means whereby the instrumentality of a rotary valve, the crank case of an automobile may be conveniently drained without the necessity of the operator crawling below the vehicle but allowing the operator to merely use a long screw driver or the like to operate the rotary valve in a convenient manner from the side of the vehicle.

A further important object of the invention resides in the provision of a rotary valve of this nature having means to prevent the accidental operation of the valve to an open position due to jarring and vibration to which the crank case is subjected in actual practice.

A still further very important object of the invention resides in the provision of an oil valve drain of this nature which is exceedingly simple in its construction, inexpensive to manufacture, and thoroughly efficient and reliable in use and operation.

With the above and other objects in view, which will appear as the description proceeds, the invention resides in the combination and arrangement of parts and in the details of construction hereinafter described and claimed.

In the drawing:

Figure 1 shows in elevation, a device constructed in accordance with the invention, assembled with a portion of the crank case of an automobile engine, the case appearing in section, Figure 2 is a bottom plan view thereof, Figure 3 is a longitudinal section through the valve, and Figure 4 is a transverse section therethrough.

Referring to the drawing in detail it will be seen that the numeral 1 denotes the crank case of an internal combustion engine on an automobile. In carrying out the invention there is provided a valve casing 2 having a neck 3 which is threaded into the crank case 1. The neck 3 has a bore 4, the casing having an outlet opening 5 alined with the bore.

A valve 6 is mounted to rotate in the casing 2 and has a transverse port 7 extending therethrough intermediate its ends. The bottom of the casing 2 at one end is provided with a notch 8 and a pin 9 extends radially from the adjacent end of the valve 6 for engaging in the notch 8. The other end of the valve is provided with an inwardly extending longitudinal bore 10 for threadedly receiving a shank 11 of a tool engaging head 12. The head 12 in the present example of the invention is provided with slot 14 to receive the blade of a screw driver. The shank 11 is locked in the bore 10 by means of a pin 15. A gasket 16 is disposed about the neck 3 between the bottom of the crank case 1 and a flat shoulder 17 formed on the casing at its juncture with said neck. This gasket is of such thickness or may be duplicated so that the valve also extends transversely of the engine so that the head 12 will be accessible from one side by means of a screw driver or like tool.

A spring 19 of the coil type is disposed about the valve 6 and impinges against the casing 2 and the tool engaging head 12 so as to hold the pin 9 in the notch 8 when the valve is closed. Therefore in order to open the valve for draining the oil from the crank case 1 it is necessary to engage the screw driver in the slot 14 and slide the valve slightly longitudinally of its length to release the pin 9 from the notch 8 and then the valve may be rotated to register its port 7 with the bore 4 and opening 5.

It is thought that the construction, operation, utility and advantages of this invention will now be quite apparent to those skilled in this art without a more detailed description thereof. The present embodiment of the invention has been disclosed in detail merely for the purposes of exemplification since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a device of the class described, a crank case, a casing having a neck threaded into the lower portion of the crank case, a plug mounted to rotate in the casing and controlling the flow of oil from the crank case through the casing, one end of the casing being formed with a notch, a pin radiating from the plug and engageable within the notch, one end of the plug remote from the pin being provided with an inwardly directed threaded bore, a shank threaded in said bore, a tool engaging head formed on the shank being of greater diameter than the plug to provide a shoulder, a spring disposed about the valve impinging against the shoulder provided by the head and the casing to hold the pin in the notch and lock the plug against casual displacement, and a pin in the plug extending into the shank for locking the shank against rotation in the bore.

2. An oil drain valve for crank cases comprising a casing adapted for threaded engagement with a wall of the crank case, a plug rotatably mounted in the casing for controlling the flow of oil from the crank case through the casing, said casing provided with a notch, said plug provided with a pin engageable with the notch for normally retaining the plug against rotation, a shank threadedly engaging said plug remote from said pin, a tool engaging head on the outer end of said shank, spring means disposed about said plug between said head and casing and engageable with said head for yieldably retaining said pin in said notch, and means carried by said plug and engaging said shank for locking said shank against casual movement relative to said plug.

In testimony whereof I affix my signature.

JOSEPH H. THIBEAULT.